(12) United States Patent
Tang

(10) Patent No.: US 11,475,916 B1
(45) Date of Patent: Oct. 18, 2022

(54) DUAL SEED LAYER FOR MAGNETIC RECORDING MEDIA

(71) Applicant: Western Digital Technologies, Inc., San Jose, CA (US)

(72) Inventor: Kai Tang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/356,044

(22) Filed: Jun. 23, 2021

(51) Int. Cl.
*G11B 5/70* (2006.01)
*G11B 5/706* (2006.01)
*G11B 5/127* (2006.01)
*G11B 5/012* (2006.01)
*H01F 1/147* (2006.01)

(52) U.S. Cl.
CPC .......... *G11B 5/70615* (2013.01); *G11B 5/012* (2013.01); *G11B 5/127* (2013.01); *H01F 1/14708* (2013.01)

(58) Field of Classification Search
None
See application file for complete search history.

(56) References Cited

U.S. PATENT DOCUMENTS

| | | | |
|---|---|---|---|
| 6,953,629 B2 * | 10/2005 | Hintz | B32B 15/018 428/827 |
| 7,824,785 B2 | 11/2010 | Inamura et al. | |
| 8,422,176 B1 * | 4/2013 | Leng | G01R 33/093 360/313 |
| 8,956,741 B1 * | 2/2015 | Li | G11B 5/7379 428/831 |
| 8,984,740 B1 * | 3/2015 | Zheng | G11B 5/3912 29/603.18 |
| 9,990,940 B1 | 6/2018 | Kang et al. | |
| 11,127,422 B1 * | 9/2021 | Liu | G11B 5/3932 |
| 2005/0053795 A1 | 3/2005 | Kubota | |

(Continued)

FOREIGN PATENT DOCUMENTS

WO 2016118080 A1 7/2016

OTHER PUBLICATIONS

Elphick, Kelvin; "Heat Assisted Magnetic Recording Media Based on Exchange Bias"; May 2016; https://core.ac.uk/download/pdf/77022595.pdf; 170 pages.

(Continued)

*Primary Examiner* — William J Klimowicz
(74) *Attorney, Agent, or Firm* — Loza & Loza, LLP; Gabriel Fitch

(57) ABSTRACT

A magnetic recording medium includes a substrate, a soft magnetic underlayer on the substrate, and a dual seed layer. The dual seed layer includes a first seed layer comprising NiFe at a first concentration, and a second seed layer comprising NiFe at a second concentration different from the first concentration and a segregant. The first seed layer may be on a soft magnetic underlayer and the second seed layer is on the first seed layer. The magnetic recording medium may further include one or more magnetic recording layers on the dual seed layer. The magnetic recording medium with the composition-graded dual seed layer may provide small grain size and good crystallographic texture for layers on the dual seed layer, including the magnetic recording layers.

25 Claims, 3 Drawing Sheets

(56) References Cited

U.S. PATENT DOCUMENTS

| | | | | |
|---|---|---|---|---|
| 2007/0082414 A1* | 4/2007 | Watanabe | ............ | G11B 5/7377 |
| | | | | 438/3 |
| 2010/0086809 A1 | 4/2010 | Kuboki | | |
| 2010/0309580 A1* | 12/2010 | Tonooka | .............. | G11B 5/7379 |
| | | | | 428/800 |
| 2012/0028077 A1* | 2/2012 | Watanabe | ................ | G11B 5/66 |
| | | | | 428/827 |
| 2013/0235490 A1 | 9/2013 | Do et al. | | |
| 2015/0124350 A1* | 5/2015 | Do | ........................... | G11B 5/66 |
| | | | | 428/828.1 |
| 2015/0262603 A1* | 9/2015 | Tonooka | .............. | G11B 5/7369 |
| | | | | 204/192.15 |
| 2021/0391533 A1* | 12/2021 | Jan | ........................ | H01L 43/12 |

OTHER PUBLICATIONS

Peng, Wenbin et al., "Co/Pd and Co/Pt Multilayers with Indium Tin Oxide Seed Layers and NiFe Soft Underlayers for Perpendicular Magnetic Recording Media"; IEEE Transactions on Magnetics; vol. 37, No. 4; Jul. 2001; https://ieeexplore.ieee.org/document/950905; 3 pages.

International Search Report and Written Opinion for International Application No. PCT/US2022/016476, dated May 15, 2022, 8 pages.

* cited by examiner

DUAL SEED LAYER FOR MAGNETIC RECORDING MEDIA

FIELD

Aspects of the present disclosure relate to magnetic recording media, and more specifically to magnetic recording media designs having a dual seed layer with a graded composition configured to provide small grain size and good crystallographic texture.

INTRODUCTION

Magnetic storage systems, such as a hard disk drives (HDDs), are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players.

Increasing the recording density of HDDs is becoming ever more challenging. Two key approaches to increasing the areal density capacity (ADC) of HDDs have included increasing the media signal-to-noise ratio (SNR), which leads to an increase in the linear density of the recording bits, and reducing the track width, which leads to an increase in the recording track density.

In HDD media, a seed layer is used to create a growth template for the subsequently-deposited films including the magnetic recording layer (MRL). Functional goals for the seed layer include small grain size and good crystallographic texture, both of which may be desirable for good media recording performance.

In prior approaches, the design goals of obtaining small grain size and obtaining good crystallographic texture are often in conflict with each other. For example, small grain size may be provided by using a thin seed layer. A thin seed layer, however, is generally characterized by a poor crystallographic texture. Conversely, good crystallographic texture may be provided by using a thick seed layer. A thick seed layer, however, is generally characterized by a large grain size.

It is desirable to provide a seed layer that is configured to provide small grain size and good crystallographic texture. The concepts disclosed below address these needs and others.

SUMMARY

One aspect of the present disclosure provides a magnetic recording medium configured for magnetic recording. The magnetic recording medium includes: a substrate, a soft magnetic underlayer on the substrate, and a dual seed layer that includes a first seed layer comprising NiFe at a first concentration, and a second seed layer comprising NiFe at a second concentration different from the first concentration and a segregant, wherein the first seed layer is on the soft magnetic underlayer and the second seed layer is on the first seed layer. The magnetic recording medium also includes one or more magnetic recording layers on the dual seed layer.

Another aspect of the present disclosure provides a method for fabricating magnetic recording media. The method includes providing a substrate, providing a soft magnetic underlayer (SUL) on the substrate, providing a first seed layer on the SUL, and providing a second seed layer on the first seed layer. The first seed layer includes NiFe at a first concentration, and the second seed layer includes NiFe at a second concentration different from the first concentration and a segregant. The method also includes providing one or more magnetic recording layers on the second seed layer.

DETAILED DESCRIPTION

Figure 1:
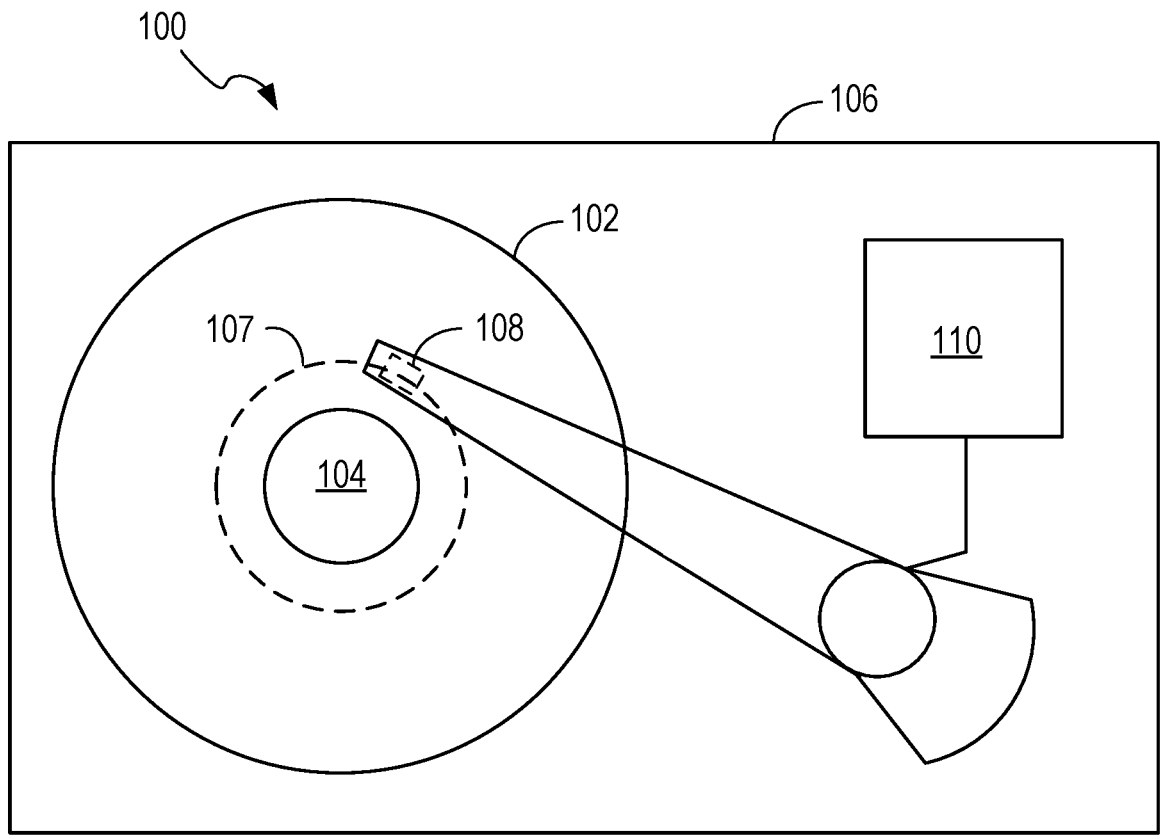
FIG. 1 is a top schematic view of a data storage device configured for magnetic recording and including a magnetic recording medium having a dual seed layer with a graded composition in accordance with some aspects of the disclosure.

Disclosed herein are magnetic recording media configured for magnetic recording. The media may include a substrate, a soft magnetic underlayer (SUL), a dual seed layer having a first seed layer and a second seed layer on top of the first seed layer, and one or more magnetic recording layers. The dual seed layer has a graded composition and is configured to provide small grain size and good crystallographic texture for subsequently-deposited films including the magnetic recording layer, which results in an increase of media signal-to-noise ratio and improvement of areal density capacity (ADC). A "graded composition" within the context of this disclosure may refer to a difference in composition or concentration of one or more materials in adjacent layers of a magnetic medium.

Crystallographic texture generally refers to the distribution of crystallographic orientations of a polycrystalline structure. It may be quantified as the full width at half maximum of an X-ray diffraction peak, generally referred to as X-ray rocking angle. The smaller the X-ray rocking angle, the better the alignment of crystallographic orientation of the polycrystalline grains and therefore, the better the crystallographic texture. In a magnetic medium, a layer of interest is the magnetic recording layer which stores the magnetic recording bits. Magnetic recording layers with narrow distribution of crystallographic orientations (i.e., small X-ray rocking angle) tend to provide high resolution which leads to high signal-to-noise ratio (SNR). A "good crystallographic texture," within the context of this disclosure may correspond to an X-ray rocking angle of the magnetic recording layer being 3.5° or lower. The seed layer, interlayer, and underlayer are designed in combination to generate an optimum template on which the magnetic recording layers can grow in good crystallographic texture and at the same time, with small grains. In comparative media using one seed layer, to maintain a 3.3° X-ray rocking angle, a grain size of 7.45 nanometers (nm) and a grain center-to-center distance of 8.37 nm can be obtained.

The magnetic recording medium disclosed herein employs a dual seed layer that improves over the previously described combination of X-ray rocking angle, grain size, and grain center-to-center distance. First, the composition of the first seed layer is selected to provide good crystallographic texture. This layer grows in good crystallographic texture on top of the SUL, which establishes a good template for the second seed layer to grow on. The second seed layer has enhanced segregation implemented using a segregant, which reduces grain size and grain center-to-center distance while maintaining the good crystallographic texture established by the first seed layer. In some examples, the enhanced segregation is achieved by addition of oxides, such as one or more of TiO2, SiO2, B2O3, Ta2O5, Cr2O3, and/or MnO. In other examples, the enhanced segregation is achieved by increasing the concentrations of selected elements, such as W and/or Al. With the dual seed layer design according to this disclosure, an improved combination of features can be achieved, including, for example, a 3.1° to 3.2° X-ray rocking angle, a 7.13 to 7.16 nm grain size, and/or a 8.16 to 8.21 nm grain center-to-center distance of the magnetic recording layer.

Also disclosed herein are methods and materials for fabricating magnetic recording media having a dual seed layer with a graded composition that provides small grain size and good crystallographic texture.

Before describing the magnetic recording medium having a dual seed layer with a graded composition that provides small grain size and good crystallographic texture, and the methods and the materials that provide such dual seed layer, a disk drive using magnetic recording media is described.

FIG. 1 is a top schematic view of a data storage device (e.g., disk drive) 100 configured for magnetic recording and including a magnetic recording medium 102 with a dual seed layer between a substrate and a magnetic recording layer, and configured with a graded composition that provides small grain size and good crystallographic texture. In some examples, the magnetic recording medium 102 may be configured as a perpendicular magnetic recording (PMR) medium. In other examples, the magnetic recording medium 102 may be configured as a heat assisted magnetic recording (HAMR) medium, a shingled magnetic recording (SMR) medium, a microwave assisted magnetic recording (MAMR) medium, or as a flexible media in the form a magnetic tape used in a tape-based data storage drive/system.

The disk drive 100 may include one or more disks/media 102 to store data. The disk/media 102 resides on a spindle assembly 104 that is mounted to drive housing 106. Data may be stored along tracks 107 in the magnetic recording layer of disk 102. The reading and writing of data are accomplished with the head/slider 108 that may have both read and write elements. The write element is used to alter the magnetization direction of a portion of the magnetic recording layer of disk 102 and thereby write information thereto. The head 108 may have magneto-resistive (MR) based elements, such as tunnel magneto-resistive (TMR) for reading, and a write pole with coils that can be energized for writing. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110 of the disk drive 100.

Figure 2:
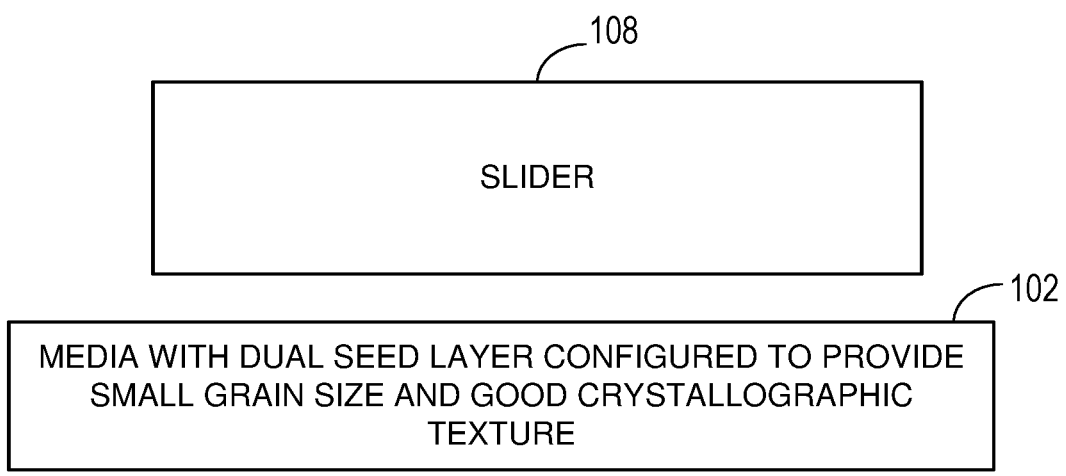
FIG. 2 is a side cross-sectional schematic view of selected components of the data storage device of FIG. 1 including the magnetic recording medium having the dual seed layer with the graded composition in accordance with some aspects of the disclosure.

FIG. 2 is a side cross-sectional schematic view of selected components of the data storage device of FIG. 1 including the magnetic recording medium 102 with a dual seed layer having a graded composition configured to provide small grain size and good crystallographic texture. The head/slider 108 is positioned above the medium 102. The head/slider 108 includes a write element and a read element (not shown) positioned along an air bearing surface (ABS) of the slider (e.g., bottom surface) for writing information to, and reading information from the medium 102. FIGS. 1 and 2 illustrate a specific example of a magnetic recording system. In other examples, embodiments of the improved media with the dual seed layer and compositions disclosed herein can be used in any suitable magnetic recording systems (e.g., such as PMR, HAMR, SMR, and MAMR recording systems). For example, the magnetic media of various embodiments disclosed herein may be flexible media in the form a magnetic tape used in a tape-based data storage drive/system. For simplicity of description the various embodiments are primarily described in the context of an example HDD magnetic recording system.

Figure 3:
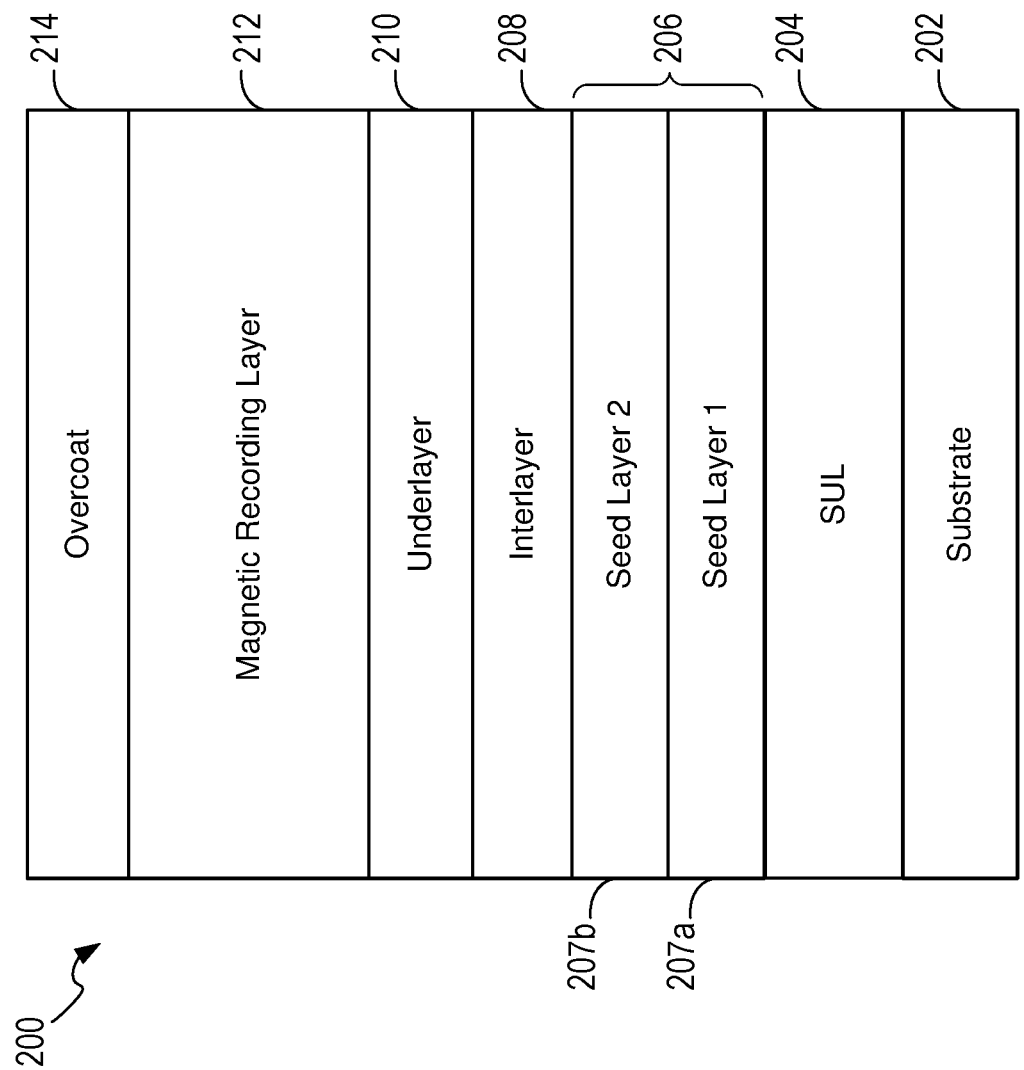
FIG. 3 is side cross-sectional schematic view of a magnetic recording medium having a dual seed layer with a graded composition in accordance with some aspects of the disclosure.

FIG. 3 is a side cross-sectional schematic view of a magnetic recording medium 200 that can be used in conjunction with the disk drive 100 of FIGS. 1 and 2. In sequence from the bottom, the medium 200 includes a substrate 202, a SUL 204, a dual seed layer 206 including a first seed layer 207a and a second seed layer 207b, an interlayer 208, an underlayer 210, a magnetic recording layer structure 212, and an overcoat layer 214. In some examples, the magnetic recording layer structure 212 may have multiple magnetic recording layers and multiple non-magnetic exchange control layers.

The substrate 202 can be made of one or more materials such as an aluminum (Al) alloy, nickel phosphorus (NiP)-plated Al, glass, glass ceramic, and/or combinations thereof. In one or more embodiments for magnetic tape recording applications, the substrate can include a flexible material, such a film made of one of various types of resins, polyesters, polyolefins, polyamides, and the like, or combinations thereof. The substrate may include non-magnetic materials, and may be laminated. In some examples, the substrate has a diameter of about 97 millimeters or less. In other embodiments, the diameter may vary.

The SUL 204 can be made of one or more materials, such as cobalt (Co), iron (Fe), molybdenum (Mo), tantalum (Ta), niobium (Nb), boron (B), chromium (Cr), or other soft magnetic materials, or combinations thereof. The SUL 204 may include an amorphous compound or combination of Co and Fe (e.g., a CoFe alloy) with the addition of one or more elements from Mo, Nb, Ta, W, and B. The SUL 204 may be configured to support magnetization of the magnetic recording layer structure 212 during data storage operations. More specifically, the SUL may be configured to provide a return path for a magnetic field applied during a write operation.

The first seed layer 207a of the dual seed layer 206 may be formed of materials selected and configured to provide good crystallographic orientation and reduced grain size. By "selected and configured," it is meant that the materials for use within the first seed layer 207a are selected, their atomic percentages are selected, and/or their particular crystallographic orientations or structures are selected. Alternatively, the materials for use within the first seed layer 207a are selected and their atomic percentages are selected such that they provide sufficient crystallographic orientation and suf-ficiently reduced grain size. For example, the first seed layer 207a may comprise NiFe at a first concentration. The first seed layer 207a may be magnetic. The first seed layer 207a may comprise a close-packed crystallographic structure with a close-packed atomic plane parallel (e.g., substantially parallel) to a surface (e.g., the top surface) of the substrate 202, wherein, the close-packed atomic plane refers to the (0001) plane in a hexagonal close-packed (HCP) crystallographic structure or the (111) plane in a face-centered cubic (FCC) crystallographic structure.

In some embodiments, the first seed layer 207a may comprise Ni with an atomic percentage in a range of 50% to 75%, and Fe with an atomic percentage in a range of 15% to 35%. The first seed layer 207a may further include one or more additional metals, such as W, Al, Cr, Ta, and/or Mo. In some embodiments, the one or more additional metals may include W with an atomic percentage in a range of 2% to 12%, and Al with an atomic percentage in a range of 0.5% to 3%. In some embodiments, the first seed layer 207a is an alloy made of NiFeWAl, NiFeWCr, NiFeCrAl, NiFeWCrAl, NiFeTaAl, NiFeTaCr, NiFeWTa, NiFeWTaAl, NiFeWTaCrAl, NiFeMoAl, NiFeMoCr, NiFeMoTa, NiFeMoTaAl, NiFeMoTaCrAl, NiFeWMoAl, NiFeWMoCr, and/or NiFeWMoCrAl. In some embodiments, the first seed layer 207a is substantially free of oxide. "Substantially free" in this context generally means that the oxide content, if any, included in the first seed layer is no greater than 0.5% of the total content (e.g., molecular percentage) of the first seed layer. In other words, the first seed layer 207a is 99.5% free of any oxide. In some embodiments, the first seed layer 207a is devoid of any oxide.

The second seed layer 207b of the dual seed layer 206 may be formed of materials selected and configured to provide small grain size while maintaining the good crystallographic orientation established by the first seed layer 207a. By "selected and configured," it is meant that the materials for use within the second seed layer 207b are selected, their atomic percentages are selected, and/or their particular crystallographic orientations or structures are selected. Alternatively, the materials for use within the second seed layer 207b are selected and their atomic percentages are selected such that they sufficiently maintain the crystallographic orientation of the first seed layer 207a and have sufficiently reduced grain size. For example, the second seed layer 207b may comprise NiFe at a second concentration different from the first concentration of the first seed layer 207a, and a segregant. The second seed layer 207b may be magnetic. The second seed layer 207b may comprise a close-packed crystallographic structure with a close-packed atomic plane parallel to a surface of the substrate 202.

In some embodiments, the segregant of the second seed layer 207b includes an oxide, and the atomic percentage of one or both of Ni and Fe in the second seed layer is less than the respective atomic percentages of Ni and Fe included in the first seed layer 207a. The molecular percentage of the oxide in the second seed layer 207b may be in a range of 0.5% to 8%. In some embodiments, the oxide of the second seed layer 207b is made of TiO2, SiO2, B2O3, Ta2O5, Cr2O3, and/or MnO. In some embodiments, the second seed layer 207b further includes one or more additional metals, such as W, Al, Cr, Ta, and/or Mo.

In other embodiments, the segregant of the second seed layer 207b includes one or more metals, such as W, Al, Cr, Ta, and/or Mo. In some embodiments, the atomic percentage of one or both of Ni and Fe is less than the respective atomic percentages of Ni and Fe included in the first seed layer. In some embodiments, the second seed layer 207b is an alloy made of NiFeWAl, NiFeWCr, NiFeCrAl, NiFeWCrAl, NiFeTaAl, NiFeTaCr, NiFeWTa, NiFeWTaAl, NiFeWTaCrAl, NiFeMoAl, NiFeMoCr, NiFeMoTa, NiFeMoTaAl, NiFeMoTaCrAl, NiFeWMoAl, NiFeWMoCr, and/or NiFeWMoCrAl.

The thicknesses of the first seed layer 207a and the second seed layer 207b may depend on the compositions of the layers. For example, in embodiments having an oxide in the second seed layer 207b, the higher the oxide concentration in the second seed layer the thinner the second seed layer is relative to the first seed layer 207a. In other words, the ratio of thickness of the first seed layer 207a to the second seed layer 207b may be greater than 1. For example, the ratio may be from 1.5:1 to 5:1, or the like. As the oxide concentration in the second seed layer 207b is reduced, the ratio of thickness of the first seed layer 207a to the second seed layer approaches 1:1. For example, the ratio may be close to 1:1 when the oxide molecular percentage approaches 0.5. Combined with the thickness ratio of the first and second seed layers, the total thickness of the first and second seed layers can be adjusted to achieve an optimum combination of small grain size and good crystallographic texture of the magnetic recording layer to maximize the recording performance of the magnetic recording media. In some examples, the total thickness of the first and second seed layers in a dual seed layer medium may be comparable to the thickness of the single seed layer in a comparative single seed layer medium. In other examples, the total thickness of the first and second seed layers in a dual seed layer medium may be thicker than the thickness of the single seed layer in a comparative single seed layer medium. The total thickness of the first and second seed layers can range from 2.5 to 6.5 nanometers.

As previously mentioned, the first seed layer 207a and the second seed layer 207b may have close-packed crystallographic structures with their close-packed atomic planes parallel to a surface of the substrate 202. The close-packed crystallographic structure for each seed layer 207a, 207b may be the same. For example, in some embodiments, the atoms in each seed layer 207a, 207b are in a face-centered cubic (FCC) arrangement. In some embodiments, the atoms in each layer 207a, 207b are in a hexagonal close packing (HCP) arrangement. The close-packed crystallographic structure for the seed layers 207a, 207b may be different. For example, in some embodiments, the atoms in the first seed layer 207a may be in a face-centered cubic (FCC) arrangement, while the atoms in the second seed layer 207b may be in a hexagonal close packing (HCP) arrangement. Alternatively, the atoms in the first seed layer 207a may be in a hexagonal close packing (HCP) arrangement, while the atoms in the second seed layer 207b may be in a face-centered cubic (FCC) arrangement. In any case, the respective close-packed crystallographic structures of the first seed layer 207a and the second seed layer 207b are oriented with their close-packed atomic planes parallel to a surface of the substrate 202 to provide a dual seed layer 206 establishing a good crystallographic texture for subsequently-deposited films including the magnetic recording layer (MRL).

In some examples, the composition-graded dual seed layer structure described herein (e.g., dual seed layer 206 composed of first seed layer 207a and second seed layer 207b) may include additional layers, which may be placed either below the first seed layer 207a, or above the second seed layer 207b, or between the first seed layer and the second seed layer. The additional layer(s) may be made of Ni, Fe, W, Al, Cu, Nb, oxides, and/or combination thereof.

The interlayer 208, which is optional in some embodiments, may be formed of Co and Cr, and an additional metal, such as Ru with an atomic percentage of Ru of at least 25%, or additional metals, such as Ru and W, with the atomic percentage of W in the range of 2 to 10% and with an atomic percentage of Ru of at least 25%. In some embodiments, the interlayer 208 comprises one of CoCrRu and CoCrRuW. The particular amount of W to employ within the interlayer 308 may depend on the materials and configurations of the adjacent layers as well as the relative amounts of Co, Cr, and Ru in the interlayer. The interlayer 208, may comprise for example, one of 50% Co, 25% Cr, and 25% Ru (Co50Cr25Ru25) and 45% Co, 25% Cr, 25% Ru, and 5% W (Co45Cr25Ru25W5), wherein the respective percentages are atomic percentages.

The underlayer 210, which is optional in some embodiments, may be made of one or more materials such as Ru and/or other suitable materials known in the art.

The magnetic recording layer 212 may comprise Co-based magnetic layers with multiple exchange control layers (ECLs). In some examples, six magnetic layers are interleaved with five ECLs, which collectively form the magnetic recording layer. In other examples, more or fewer ECLs may be formed. The ECLs may be made of non-magnetic or weakly magnetic materials provided to help break exchange coupling vertically between layers (or otherwise control such coupling) and to help achieve grain isolation of the magnetic layers.

The overcoat 214 may made of one or more materials such as C and/or other suitable materials known in the art. In one embodiment, the medium 200 may also include a lubricant layer on the overcoat layer. In such case, the lubricant layer can be made of one or more materials such as a polymer-based lubricant and/or other suitable materials known in the art.

The functional characteristics and benefits of media with dual seed layer 206 can be quantified in testing. For example, Table I (shown below) summarizes media signal-to-noise ratio (SNR), linear recording density (z747), track density ($TP_{cm}$), and areal density capacity ($AD_{CM}$) values from a media component test that compares a media design with a dual seed layer (e.g., such as dual seed layer 206 in media 200) to a comparative media design having a single seed layer made of Ni69Fe25W5Al1. The Ni69Fe25W5Al1 here refers to 69 atomic percent of Ni, 25 atomic percent of Fe, 5 atomic percent of W, and 1 atomic percent of Al. The media design with the dual seed layer 206 included a first seed layer (e.g., first seed layer 207a) of Ni69Fe25W5Al1 and a second seed layer (e.g., second seed layer 207b) of Ni67Fe25W5Al1-2TiO2. The Ni67Fe25W5Al1-2TiO2 here refers to 67 atomic percent of Ni, 25 atomic percent of Fe, 5 atomic percent of W, 1 atomic percent of Al, and 2 molecular percent of TiO2.

As shown in Table I, the value for $wsSNR_{initial}$ for the media with the dual seed layer is improved by 0.2 dB compared to the comparative media with the single seed layer, while the value for $wsSNR_{final}$ is consistent with the comparative media seed layer. As further shown in Table I, the value for linear recording density (z747) for the dual seed layer media is increased by about 25 kilobits per inch compared to the comparative media, the value for track density ($TP_{cm}$) for the dual seed layer is decreased by about 2000-3000 tracks per inch (tpi) or 2-3 ktpi compared to the comparative media, and the value for areal density capacity ($AD_{CM}$) for the dual seed layer media is increased by 4-5 gigabits per inch squared compared to the comparative media.

In Table I, note that MCW refers to magnetic core width, OW(p) refers to a reverse overwrite test, $wsSNR_{initial}$ refers to an initial weighted-sum SNR, and $wsSNR_{final}$ refers to a final weighted-sum SNR.

TABLE I

| Seed Layer | MCW nm | OW(p) dB | $wsSNR_{initial}$ dB | $wsSNR_{final}$ dB | z747 kbpi | $TP_{cm}$ ktpi | $AD_{CM}$ Gb/in² |
|---|---|---|---|---|---|---|---|
| Comparative Media (Ni69Fe25W5Al1) | 48.4 | 29.2 | 11.7 | 10.7 | 2272 | 493 | 1120 |
| Dual Seed Layer Media (Ni69Fe25W5Al1/ Ni67Fe25W5Al1-2TiO2) | 48.6 | 29.2 | 11.9 | 10.7 | 2297 | 490 | 1125 |

Further quantifying the functional characteristics and benefits of media with dual seed layer 206, Table II summarizes X-ray rocking angle test measurements and grain size measurements that compare the media with dual seed layer 206 to a comparative media having a single seed layer of Ni69Fe25W5Al1. The dual seed layer 206 in the media tested here included a first seed layer 207a of Ni69Fe25W5Al1 and a second seed layer 207b of Ni67Fe25W5Al1-2TiO2.

As shown in Table II, the media with the dual seed layer yields similar crystallographic textures to that of the comparative media. For example, the Ru(0004) of the media with the dual seed layer is at least within 0.06° (on the wide side) of the comparative single seed layer media, wherein Ru(0004) is a magnitude of the X-ray rocking angle of the underlayer 210 that is measured using (0004) diffractions. The Mag(0004) of the media with the dual seed layer is at least within 0.02° (on the narrow side) of the comparative single seed layer media, wherein Mag(0004) is a magnitude of to the X-ray rocking angle of the MRL layer 212 that is measured using (0004) diffractions. Taking into account the above comparative results of Ru(0004) and Mag(0004) of the dual seed and single seed layer cases holistically, it can be concluded that the dual seed layer and single seed layer provide similarly good growth templates so that the underlayer and magnetic recording layer can grow with comparably good crystallographic textures. On the other hand, as shown in Table II, the media with the dual seed layer yields a smaller grain size than that of the comparative media. For example, the grain size of the dual seed layer media is decreased by about 0.29 nanometers (nm) compared to the comparative single seed layer media, wherein the grain size refers to grain size of the magnetic recording layer. As further shown in Table II, the media with the dual seed layer yields a smaller grain center-to-center (CTC) distance than that of the comparative media, wherein the CTC refers to grain center-to-center distance of the magnetic recording layer. For example, the CTC of the dual seed layer media is decreased by about 0.16 nanometers (nm) compared to the comparative single seed layer media. The grain size and CTC herein were measured with high-resolution scanning electron microscopy (HRSEM) performed on the top of the magnetic recording media.

TABLE II

| Seed Layer | Ru(0004) | Mag (0004) | Grain Size (nm) | CTC (nm) |
|---|---|---|---|---|
| Comparative Media (Ni69Fe25W5Al1) | 3.01° | 3.33° | 7.45 | 8.37 |
| Dual Seed Layer Media (Ni69Fe25W5Al1/ Ni67Fe25W5Al1—2TiO2) | 3.07° | 3.18° | 7.16 | 8.21 |

Figure 4:
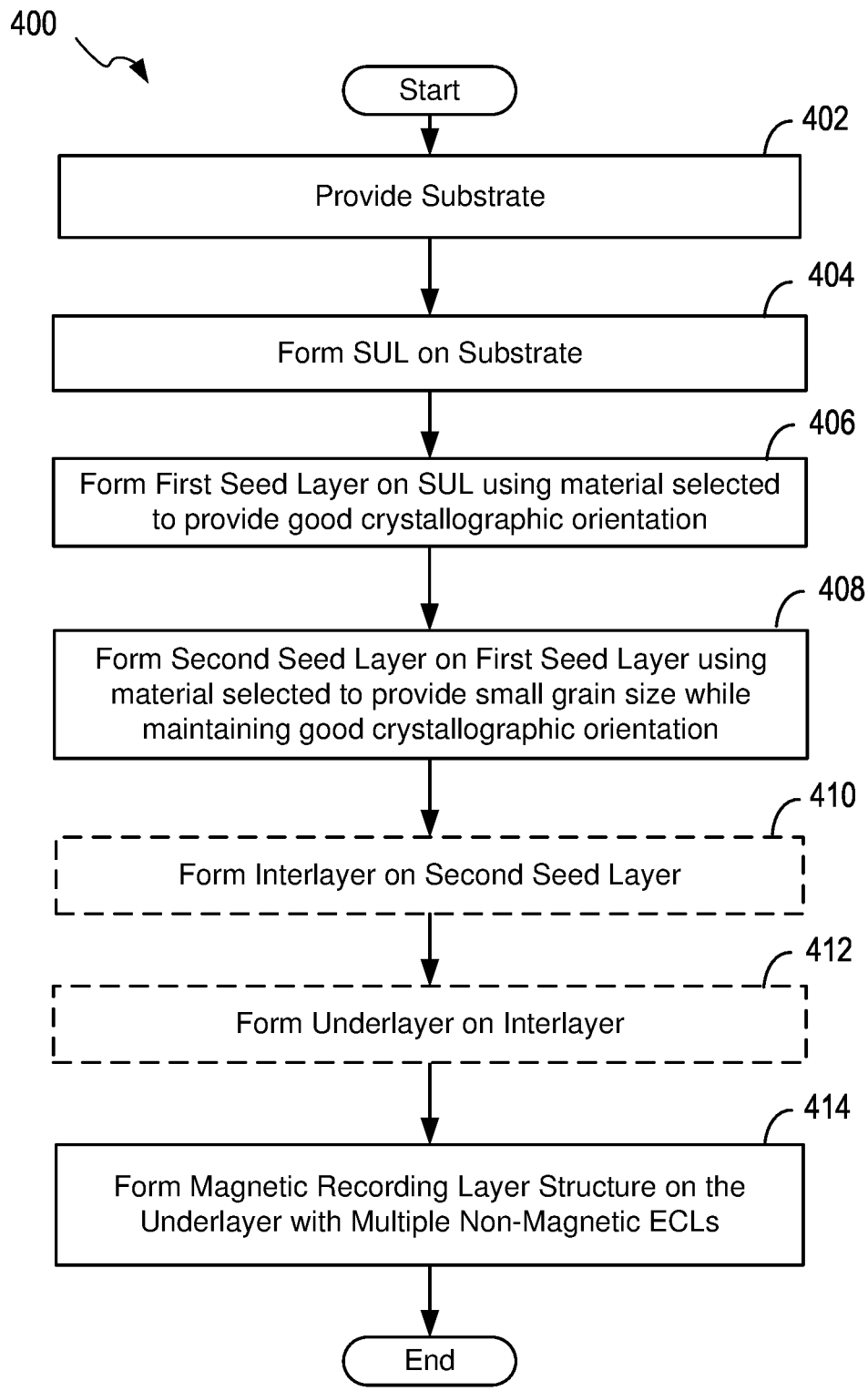
FIG. 4 is a flowchart of a process for fabricating a magnetic recording medium having a dual seed layer with a graded composition in accordance with some aspects of the disclosure.

FIG. 4 is a flowchart of a process 400 for fabricating a magnetic recording medium including a magnetic recording layer structure. In particular embodiments, the process 400 can be used to fabricate the magnetic recording media described above including medium 102 and/or medium 200.

At block 402, the process provides a substrate. The substrate can be made of one or more materials such as an Al alloy, NiP-plated Al, glass, glass ceramic, and/or combinations thereof.

At block 404, a soft magnetic underlayer (e.g., SUL 204 in FIG. 3) is provided on the substrate. The SUL can be made of one or more materials, such as Co, Fe, Mo, Ta, Nb, B, Cr, or other soft magnetic materials, or combinations thereof.

At block 406, a first seed layer (e.g., first seed layer 207a in FIG. 3) is provided on the soft magnetic underlayer. The first seed layer may be formed of materials selected and configured to provide good crystallographic orientation and reduced grain size. For example, the first seed layer may include NiFe at a first concentration. In some embodiments, the first seed layer may comprise Ni with an atomic percentage in a range of 50% to 75%, and Fe with an atomic percentage in a range of 15% to 35%. The first seed layer 207a may further include one or more additional metals, such as W, Al, Cr, Ta, and/or Mo. In some embodiments, the one or more additional metals may include W with an atomic percentage in a range of 2% to 12%, and Al with an atomic percentage in a range of 0.5% to 3%. In some embodiments, the first seed layer 207a is substantially free of oxide.

At block 408, a second seed layer (e.g., second seed layer 207b in FIG. 3) is provided on the first seed layer. The second seed layer may be formed of materials selected and configured to provide small grain size while maintaining the good crystallographic orientation established by the first seed layer. For example, the second seed layer may include NiFe at a second concentration different from the first concentration and a segregant. In some embodiments, the segregant of the second seed layer includes an oxide, and the atomic percentage of one or both of Ni and Fe in the second seed layer is less than the respective atomic percentages of Ni and Fe included in the first seed layer. In other embodiments, the segregant of the second seed layer includes one or more metals, such as W, Al, Cr, Ta, and/or Mo. In some embodiments, the atomic percentage of one or both of Ni and Fe is less than the respective atomic percentages of Ni and Fe included in the first seed layer.

At block 410, an interlayer (e.g., interlayer 208 in FIG. 3) may optionally be provided on the second seed layer 207b. The interlayer may be formed of Co and Cr, and an additional metal, such as Ru with an atomic percentage of Ru of at least 25%, or additional metals, such as Ru and W, with the atomic percentage of W in the range of 2 to 10% and with an atomic percentage of Ru of at least 25%.

At block 412, an underlayer (e.g., underlayer 210 in FIG. 3) may optionally be provided on the interlayer. The underlayer may be made of one or more materials such as Ru and/or other suitable materials known in the art.

At block 414, a magnetic recording layer structure (e.g., structure 212 in FIG. 3) is provided on the underlayer. In some embodiments the magnetic recording layer structure has or includes multiple non-magnetic ECLs. In one embodiment, an overcoat (e.g., overcoat layer 214 in FIG. 3) may be provided on the magnetic recording layer structure.

In some embodiments, the processes herein can perform the sequence of actions in a different order. In other embodiments, the processes can skip one or more of the actions. In still other embodiments, one or more of the actions are performed simultaneously. In some embodiments, additional actions can be performed. For example, in one aspect, the process may include any additional actions needed to fabricate the magnetic recording layer structure.

In several embodiments, the forming or deposition of such layers can be performed using a variety of deposition sub-processes, including, but not limited to physical vapor deposition (PVD), direct current (DC) magnetron sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary"" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X," as used in the disclosure shall mean within 10 percent of the 'value X'. For example, a value of about 1 or approximately 1 would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

What is claimed is:

1. A magnetic recording medium, the magnetic recording medium comprising:
    a substrate;
    a soft magnetic underlayer on the substrate;
    a dual seed layer including:
        a first seed layer having a first seed layer thickness and comprising NiFe at a first concentration; and
        a second seed layer having a second seed layer thickness and comprising NiFe at a second concentration different from the first concentration and a segregant that comprises an oxide having an oxide concentration, wherein the thicknesses of the first and second seed layers are configured in accordance with a thickness ratio in which the higher the concentration of the oxide in the second seed layer, the thinner the second seed layer thickness is relative to the first seed layer thickness, and wherein the first seed layer is on the soft magnetic underlayer and the second seed layer is on the first seed layer; and
    one or more magnetic recording layers on the dual seed layer.

2. The magnetic recording medium of claim 1, wherein the first seed layer comprises:
    Ni with an atomic percentage in a range of 50% to 75%; and
    Fe with an atomic percentage in a range of 15% to 35%.

3. The magnetic recording medium of claim 2, wherein the first seed layer further comprises:
    one or more additional metals selected from the group consisting of: W, Al, Cr, Ta, Mo, and combinations thereof.

4. The magnetic recording medium of claim 3, wherein the one or more additional metals comprise:
    W with an atomic percentage in a range of 2% to 12%; and
    Al with an atomic percentage in a range of 0.5% to 3%.

5. The magnetic recording medium of claim 2, wherein the first seed layer is substantially free of oxide.

6. The magnetic recording medium of claim 2, wherein:
    the atomic percentage of one or both of Ni and Fe in the second seed layer is less than the respective atomic percentages of Ni and Fe included in the first seed layer.

7. The magnetic recording medium of claim 6, wherein the molecular percentage of the oxide is in a range of 0.5% to 8%.

8. The magnetic recording medium of claim 6, wherein the oxide is selected from the group consisting of: $TiO_2$, $SiO_2$, $B_2O_3$, $Ta_2O_5$, $Cr_2O_3$, MnO, and combinations thereof.

9. The magnetic recording medium of claim 6, wherein the second seed layer further comprises:
    one or more additional metals selected from the group consisting of W, Al, Cr, Ta, Mo, and combinations thereof.

10. The magnetic recording medium of claim 2, wherein:
    the segregant of the second seed layer further comprises one or more metals selected from a group consisting of W, Al, Cr, Ta, Mo, and combinations thereof, and
    the atomic percentage of one or both of Ni and Fe in the second seed layer is less than the respective atomic percentages of Ni and Fe included in the first seed layer.

11. The magnetic recording medium of claim 1, wherein each of the first seed layer and the second seed layer comprises a close-packed crystallographic structure with a close-packed atomic plane parallel to a surface of the substrate.

12. The magnetic recording medium of claim 1, wherein the one or more magnetic recording layers comprise Co-based magnetic layers with multiple exchange control layers (ECLs).

13. The magnetic recording medium of claim 1, wherein a total thickness of the first seed layer and the second seed layer is between 2.5 and 6.5 nanometers.

14. A data storage device, comprising:
    the magnetic recording medium of claim 1; and
    a recording head configured to write information to the magnetic recording medium.

15. The magnetic recording medium of claim 1, further comprising:
    an interlayer on the second seed layer; and
    an underlayer on the interlayer; and
    wherein the one or more magnetic recording layers is on the underlayer.

16. A method for fabricating magnetic recording media, comprising:
    providing a substrate;
    providing a soft magnetic underlayer (SUL) on the substrate;
    providing a first seed layer on the SUL having a first seed layer thickness, the first seed layer comprising NiFe at a first concentration;

providing a second seed layer on the first seed layer, the second seed layer having a second seed layer thickness and comprising NiFe at a second concentration different from the first concentration and a segregant that comprises an oxide having an oxide concentration;

wherein the thicknesses of the first and second seed layers are configured in accordance with a thickness ratio in which the higher the concentration of the oxide in the second seed layer, the thinner the second seed layer thickness is relative to the first seed layer thickness; and providing one or more magnetic recording layers on the second seed layer.

17. The method of claim 16, wherein the first seed layer comprises:

Ni with an atomic percentage in a range of 50% to 75%; and

Fe with an atomic percentage in a range of 15% to 35%.

18. The method of claim 17, wherein the first seed layer further comprises:

one or more additional metals selected from the group consisting of: W, Al, Cr, Ta, Mo, and combinations thereof.

19. The method of claim 17, wherein the first seed layer is substantially free of oxide.

20. The method of claim 17, wherein:

the atomic percentage of one or both of Ni and Fe in the second seed layer is less than the respective atomic percentages of Ni and Fe included in the first seed layer.

21. The method of claim 17, wherein:

the segregant of the second seed layer further comprises one or more metals selected from a group consisting of W, Al, Cr, Ta, Mo, and combinations thereof, and the atomic percentage of one or both of Ni and Fe in the second seed layer is less than the respective atomic percentages of Ni and Fe included in the first seed layer.

22. The method of claim 17, wherein each of the first seed layer and the second seed layer comprises a close-packed crystallographic structure with a close-packed atomic plane parallel to a surface of the substrate.

23. The method of claim 16, further comprising:

providing an interlayer on the second seed layer; and providing an underlayer on the interlayer; and wherein the providing the one or more magnetic recording layers on the second seed layer comprises providing the one or more magnetic recording layers on the underlayer.

24. The method of claim 16, wherein a ratio of the second thickness to the first thickness approaches 1:1 as the oxide concentration in the second seed layer approaches zero.

25. The method of claim 16, further comprising selecting the first seed layer thickness and selecting the oxide concentration for the second seed layer and then configuring the second layer thickness in accordance with the thickness ratio based on the first seed layer thickness and the selected oxide concentration.

* * * * *